(12) United States Patent
Spence et al.

(10) Patent No.: US 7,004,478 B2
(45) Date of Patent: Feb. 28, 2006

(54) SHALLOW METALLIC S-SEAL

(75) Inventors: John Loyd Spence, Severna Park, MD (US); Stephen B. Rowland, Laurel, MD (US)

(73) Assignee: PerkinElmer Inc., Wellesley, MA (US)

( * ) Notice: Subject to any disclaimer, the term of this patent is extended or adjusted under 35 U.S.C. 154(b) by 0 days.

(21) Appl. No.: 10/005,178

(22) Filed: Dec. 7, 2001

(65) Prior Publication Data

US 2003/0107188 A1 Jun. 12, 2003

(51) Int. Cl.
*F16J 15/02* (2006.01)
(52) U.S. Cl. ...................................... 277/644; 277/626
(58) Field of Classification Search ................ 277/644, 277/648, 649, 650, 626
See application file for complete search history.

(56) References Cited

U.S. PATENT DOCUMENTS

| | | | | |
|---|---|---|---|---|
| 3,285,632 A | * | 11/1966 | Dunkle | ......................... 285/363 |
| 3,537,733 A | | 11/1970 | Martin | |
| 3,602,532 A | * | 8/1971 | Ehrenberg | .................... 285/364 |
| 3,630,553 A | * | 12/1971 | Foulger | ....................... 285/340 |
| 3,754,766 A | * | 8/1973 | Asplund | ...................... 277/644 |
| 3,767,216 A | * | 10/1973 | Martin | ......................... 277/626 |
| 4,039,741 A | * | 8/1977 | Havens | ......................... 277/608 |
| 4,056,682 A | * | 11/1977 | Havens et al. | .......... 174/35 GC |
| 4,121,843 A | | 10/1978 | Halling | |
| 4,282,643 A | * | 8/1981 | Yamasaki et al. | ........... 29/527.2 |
| 4,395,049 A | * | 7/1983 | Schertler | ..................... 277/637 |
| 4,457,523 A | | 7/1984 | Halling et al. | |
| 4,779,901 A | * | 10/1988 | Halling | ......................... 285/184 |
| 4,813,692 A | | 3/1989 | Halling et al. | |
| 4,819,973 A | * | 4/1989 | Pegon | ...................... 285/332.3 |
| 4,854,600 A | | 8/1989 | Halling et al. | |
| 5,176,413 A | * | 1/1993 | Westman | ..................... 285/321 |
| 5,222,744 A | * | 6/1993 | Dennys | ....................... 277/608 |
| 5,706,787 A | * | 1/1998 | Fujikawa | ..................... 123/470 |
| 5,716,052 A | | 2/1998 | Swensen et al. | |
| 5,730,445 A | * | 3/1998 | Swensen et al. | ............ 277/647 |
| 5,954,343 A | | 9/1999 | Sumida et al. | |
| 6,209,884 B1 | * | 4/2001 | Taudt | ......................... 277/607 |
| 6,619,668 B1 | * | 9/2003 | Pyre | ............................ 277/644 |

FOREIGN PATENT DOCUMENTS

| | | |
|---|---|---|
| FR | 2036502 | 12/1970 |
| FR | 2800147 A1 | 4/2001 |

* cited by examiner

*Primary Examiner*—Alison K. Pickard
(74) *Attorney, Agent, or Firm*—Shinjyu Global IP Counselors, LLP

(57) ABSTRACT

A metallic seal is provided that concentrates the available load over a narrow band to produce a sealing dam over a sufficient width to minimize leakage on a molecular level. The metallic seal has a first annular end section with has a first annular sealing surface, a second annular end section with a second annular sealing surface and an annular center section extending between the first and second annular end sections to form a ring having a central passageway with a center longitudinal axis. The third annular section is frustoconical tube with the first and second annular end sections being contiguously arranged at opposite ends of the annular center section such that sealing loads applied substantially perpendicularly on the first and second annular sealing surfaces primarily deform due to torsional stress of the metallic seal.

28 Claims, 4 Drawing Sheets

SHALLOW METALLIC S-SEAL

BACKGROUND OF THE INVENTION

1. Field of the Invention

This invention generally relates to a metallic seal for creating a seal between a pair of members. More specifically, the present invention relates to a seal that provides a highly reliable seal by concentrating the available load over a narrow band (small sealing area equaling high contact stress) to produce a high quality sealing dam over a sufficient width to minimize leakage on a molecular level.

2. Background Information

A typical static seal assembly has a first member with a first mating surface, an annular seal of suitable sealing material (e.g., metal O-ring), and a second member with a second mating surface. A mechanical load is applied to the seal through the first and second mating surfaces of the members. Typically, the mechanical load is created by torquing down a multitude of fasteners such that a displacement, also known as compression, occurs between the sealing surfaces. The net loading of the contact surfaces creates the two sealing dams.

The low leakage requirement can be achieved by compressing a solid metal ring of rectangular cross-section with a sufficient force. One problem with a solid metal ring is that the force created could be of sufficient magnitude to cause plastic deformation of the mating surfaces of the members. This plastic deformation of the mating surface is called brinelling. Once brinelled, the probability of proper resealing is drastically reduced without first repairing the damaged sealing surfaces.

The design requirements for static sealing therefore requires an optimum load level and flexibility. A good static seal when compressed must be able to generate load levels large enough to seal, but not large enough to brinell the cavity surfaces. Currently, there are many types of metallic seals in the prior art.

The metallic "O" rings were an early effort to meet these conflicting design requirements. However, the resiliency of this type of seal is rather limited because the "O" ring, whether solid or hollow, is usually too stiff, and is inherently expensive. The development of the C-shaped seal was an improvement to the "O" ring. In particular, by simply discarding a portion of the "O", the hoop restraint of the seal is greatly reduced and the seal becomes more flexible. However, the basic "C" seals typically cannot reach the desirable standard vacuum level of $1 \times 10e^{-9}$ cc/sec He leakage rate or better without modification and without being coated with very soft plating materials. Some previous C-shaped seals have been designed to provide this level of seal integrity.

In addition to typical "C" seals, other prior seals include spring-energized "C" seals, spring-energized "C" seals with triangular feature (Delta-seal), deformable metallic gaskets, E-seals with single or multiple convolutions. Some of these previous designs can provide the level of seal integrity provided by the disclosed device at comparable load levels or physical restraints.

Examples of these prior sealing rings are disclosed in U.S. Pat. No. 4,813,692 and U.S. Pat. No. 4,854,600. However, the seals of these two patent address semi-dynamic applications where the two sealing surfaces are moving relative to each other. These patents are associated with larger cross sections and the method of deformation uses both axial bending and torsion.

In view of the above, it will be apparent to those skilled in the art that there exists a need for improved metallic sealing rings with optimized sealing areas that can be used at high temperatures and pressures while providing high reliability and pressure tight sealing. This invention addresses this need in the art as well as other needs, which will become apparent to those skilled in the art once given this disclosure.

SUMMARY OF THE INVENTION

One object of the present invention is to provide a highly reliable metallic seal that is relatively inexpensive to manufacture.

Another object of the present invention is to provide a metallic seal, which has geometrically simple cross sections, and can be manufactured with existing equipment in large quantities with tight tolerances.

Still another object of the present invention is to provide a highly reliable metallic seal, which concentrates the available load over a narrow band which minimizes the required load to compress the seal by optimizing the sealing dam width.

Yet another object of the present invention is to provide a metallic seal in which the seal dam does not significantly shift during compression of the seal.

Another object of the present invention is to provide a metallic seal which has a leakage rate of less than $1 \times 10e^{-9}$ cc/sec He leakage rate or better.

The foregoing objects can basically be attained by providing a metallic seal that concentrates the available load over a narrow band to produce a sealing dam over a sufficient width to minimize leakage while optimizing the load required to compress the seal. The metallic seal comprises a first annular end section, a second annular end section and an annular center section. The first annular end section has a first annular sealing surface facing in a first direction and lying in a first plane to contact a first member for creating a first annular sealing dam therebetween. The second annular end section has a second annular sealing surface facing in a second direction that is opposite to the first axial direction, and lying in a second plane that is substantially parallel to the first plane to contact a second member for creating a second annular sealing dam therebetween. The annular center section extends between the first and second annular end sections to form a ring having a central passageway with a center longitudinal axis. The third annular section is frustoconical tube with the first and second annular end sections being contiguously arranged at opposite ends of the annular center section such that sealing loads applied substantially perpendicularly on the first and second annular sealing surfaces primarily deform due to torsional stress of the metallic seal.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
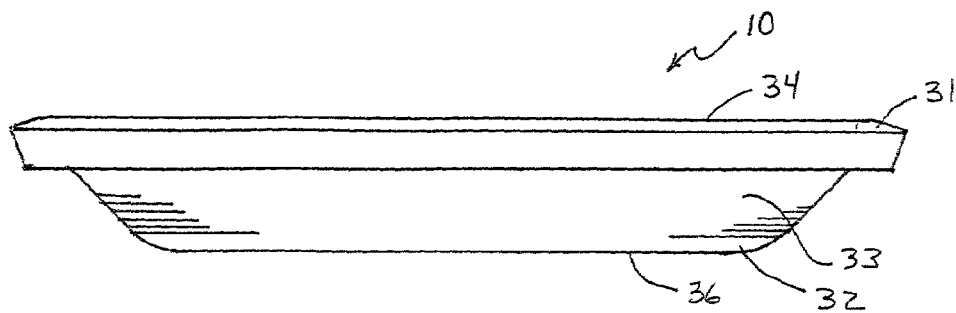
FIG. 1 is a side elevational view of a shallow metallic seal in accordance with a first embodiment of the present invention, with the thickness of the seal exaggerated for purposes of illustration.

Initially referring to FIGS. 1–4, a shallow metallic seal 10 in accordance with a first embodiment of the present invention is illustrated. The shallow metallic seal 10 is illustrated as being circular. However, it will be apparent to those skilled in the art from this disclosure that the shallow metallic seal 10 could have other types of non-circular ring shapes and can also be produced in a variety of heights. Moreover, the thickness of the metallic seal 10 in the attached drawings has been exaggerated for purposes of illustration.

The purpose of the metallic seal 10 is to provide a seal between two opposing members, e.g., either metal to metal, metal to ceramic, ceramic to ceramic, or any appropriate combination of materials commonly used in critical fluid and/or gas sealing. Additionally, the metallic seal 10 can be used between flanges or components for any fluid control or pneumatic application. The metallic seal 10 will most typically be used in a groove, counterbore or between relatively flat surfaces providing a fixed separation of the components to be sealed. The metallic seal 10 can be produced in circular or non-circular configurations and may also be produced in a variety of heights.

As explained below in more detail, the shallow metallic seal 10 of the present invention provides highly reliable sealing between two members by concentrating the available load over a narrow band (small surface area equaling high contact stress). Theses narrow sealing bands or surfaces produce a high quality sealing dam over a sufficient width to minimize leakage on a molecular level. By minimizing the seal dam widths over which the intimate contact between seal and mating surfaces is needed, a high performance seal can be achieved without high compression loads. In other words, the shallow metallic seal 10 of the present invention allows its substantially parallel surfaces of the seal 10 to be in intimate contact with the two cavity faces, resulting in a controlled contact stress (load divided by the area of the annulus).

The shallow metallic seal 10 of the present invention is designed to be used in to a wide range of sealing performance. The shallow metallic seal 10 of the present invention is especially applicable to the semiconductor equipment industry, the vacuum equipment industry, the data storage device industry, or any other industry where high reliability and/or extremely tight sealing ($1 \times 10e^{-9}$ cc/sec He leakage rate or better) is required. The shallow metallic seal 10 of the present invention is also applicable anywhere that the basic configuration lends itself to the sealing gland dimensions or the available bolt loading. For example, the shallow metallic seal 10 can be used in a wide variety of applications required in the Ultra High Vacuum (UHV) industry, the Aerospace, the Power Generation industry and any other industry that requires the above stated functionality.

In particular, the shallow metallic seal 10 provides high pressure, high temperature sealing with rates of 0.01 SCFM per inch of diameter to high reliability and pressure tight with rates less than $1 \times 10e^{-9}$ cc/sec. The shallow metallic seal 10 of the present invention is designed to perform at wide range of force to compression or pounds per circumferential inch (PCI).

Figure 4:
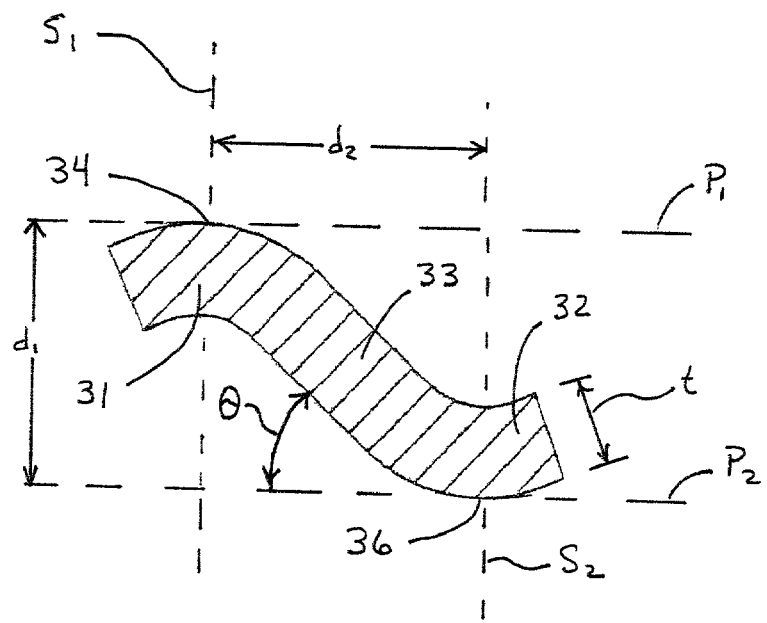
FIG. 4 is an enlarged cross-sectional profile of the shallow metallic seal illustrated in FIGS. 1–3 prior to compression of the metallic seal, i.e., unloaded.

The shallow metallic seal 10 has a uniform cross sectional profile as seen in FIG. 4. The term "cross-sectional profile" as used herein and in the claims refers to a partial cross sectional shape of a portion of an annular seal as defined by a longitudinal plane passing through only one point of the annular seal.

The shallow metallic seal 10 is constructed of a ductile alloy that is pressed worked to form an annular member that has a cross sectional profile as seen in FIG. 4. For example, the base material of the seal 10 is constructed of a ductile alloy or metallic element such as tin, nickel, aluminum, copper, stainless steel, Inconel and other nickel based alloys that improve seal integrity. Preferably, the base material of the seal 10 is formed of a corrosion resistant alloy that is selected from the group of nickel based alloys, copper based alloys, tin, aluminum based alloys and stainless steel. Optionally, a softer ductile coating could also be employed over the base material (ductile alloy). Examples of such ductile coatings include, but not limited to, tin, aluminum, nickel indium, silver, PFA, PTFE, etc. The ductile coating preferably has a thickness between about 0.001 inch and 0.006 inch. This ductile coating can cover the entire seal surfaces or can be located only at the sealing surfaces. Other metal elements and non-metallic compounds can be employed as well for the coating.

The shallow metallic seal 10 allows for seal cavity tolerances by designing the seal stiffness to be acceptable over the combined tolerance range of the cavity plus the seal. By designing the seal's cross-sectional profile as shown in FIG. 4, the deflection of the section is controlled. By varying the cross section (thickness, radius of curvature at the seal interface, angle, height and radial width) the load can be designed such that the seal will function in a variety of seal gland depths, and with different coatings, each with their own specific yield strengths, i.e. requiring more or less load to create a condition whereby the coating plastically deforms over a given width.

Figure 5:
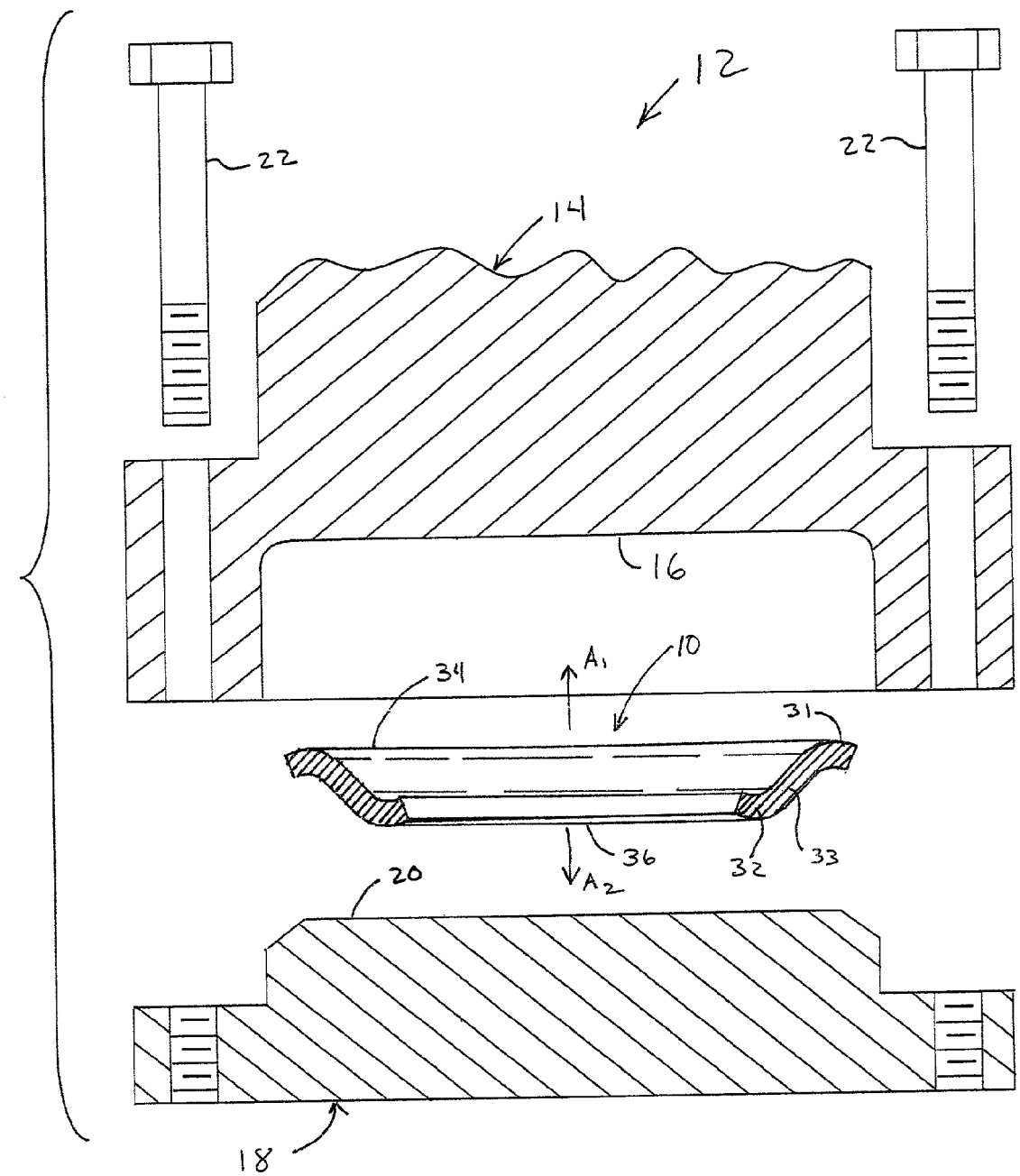
FIG. 5 is an exploded, longitudinal cross-sectional view of the shallow metallic seal illustrated in FIGS. 1–4 together with a seal assembly having a pair of mating members which are coupled together by fasteners to axially compress the metallic seal for creating an annular seal therebetween.
Figure 6:
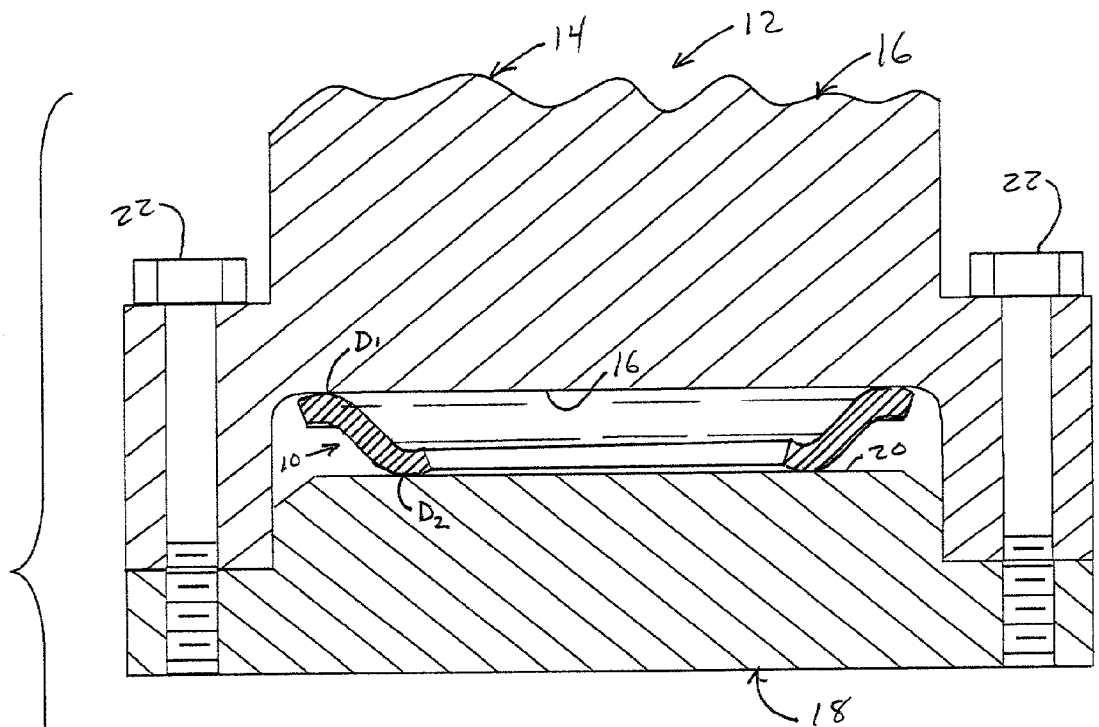
FIG. 6 is a longitudinal cross-sectional view, similar to FIG. 5, of the mating members and the metallic seal, but after the mating members have been coupled together by the fasteners to compress the metallic seal for creating an annular seal therebetween.

As seen in FIGS. 5 and 6, a sealing assembly 12 in accordance with a first embodiment of the present invention is diagrammatically illustrated to show the metallic seal 10 being used. More specifically, the seal assembly 12 includes a first member 14, with a first mating or contact surface 16 and a second member 18 having a second mating or contact surface 20 for contacting the seal 10. The first and second members 14 and 18 are coupled together by a plurality of fasteners or bolts 22. The first and second members 14 and 18 can be any two members or devices that need a seal there between. Thus, the first and second members 14 and 18 are not illustrated with any particular structure.

For example, a variant of the metallic seal 10 can be constructed such that an effective, low cost seal can be achieved for high temperature and/or high pressure pneumatic applications. This variant can be constructed in a similar manner as the high leak integrity version illustrated herewith.

The shallow metallic seal 10 is a one-piece, unitary member formed from a single sheet material. Optionally, the metallic seal 10 can have a soft coating over lying the base material. Basically, the cross-sectional profile of the shallow metallic seal 10 can be divided into three annular sections three annular section, i.e., a first annular end section 31, a second annular end section 32 and a third annular center section 33. In the illustrated embodiment, the first and second annular end sections 31 and 32 have curved cross-sectional profiles, while the third annular center section 33 has a straight cross-sectional profile. Thus, the annular sections 31–33 are configured to form a somewhat S-shaped cross section. This S-shaped cross section is preferably uniform along the entire circumference of the metallic seal 10. In the illustrated embodiment, the third annular center section 33 is a frustoconical section. However, the third annular center section 33 can have a curved cross-sectional profile and be a non-circular section viewed in the axial direction. In any event, the third annular center section 33 is frustoconically shaped. The term "frustoconically shaped" as used herein and in the claims refers to an annular section having first and second annular ends with one of the ends having a diameter or transverse dimension that is larger than the diameter or transverse dimension of the other end and the annular section between the first and second annular ends be non-undulated.

The first annular end section 31 has a first annular sealing surface 34 facing in a first axial direction $A_1$ and lying in a first flat contact plane $P_1$. The first annular sealing surface 34 contacts the first contact surface 16 of the first member 14 for creating a first annular sealing dam $D_1$ therebetween. The second annular end section 32 has a second annular sealing surface 36 facing in a second axial direction $A_2$ that is opposite to the first axial direction $A_1$, and lies in a second flat contact plane $P_2$ that is substantially parallel to the first flat contact plane $P_1$. The second annular sealing surface 36 contacts the second contact surface 20 of the second member 18 for creating a second annular sealing dam $D_2$ therebetween. The annular center section 33 extends between the first and second annular end sections 31 and 32 to form a ring having a central passageway 38 with a center longitudinal axis C.

The first and second sealing surfaces 34 and 36 are preferably convexly curved surfaces with identical curvatures that extend through an arc α of about 60° as seen in FIG. 4. In other words, the first and second sealing surfaces 34 and 36 are basically annular sealing lines $S_1$ and $S_2$ with no radial width prior to compression of the seal 10. As seen in FIG. 4. the annular sealing lines $S_1$ and $S_2$ are located closer to midpoints $M_1$ and $M_2$ of the first and second sealing surfaces 34 and 36, respectively, than to either of the end points of the first and second sealing surfaces 34 and 36. By tightening the fasteners 22, the metallic seal 10 is loaded, and thus, compressed to plastically deform the seal primarily through torsion and create the pair of annular seal dams $D_1$ and $D_2$ between the metallic seal 10 and the first and second members 14 and 18. Deformation of the metallic seal 10 is about 10% to 25% of the axial height of the seal 10 between its sealing surfaces 34 and 36. Once the seal 10 is compressed, the first and second sealing surfaces 34 and 36 are deformed to form flat sealing surfaces that correspond to the first and second annular sealing dams $D_1$ and $D_2$. The minimum effective widths of first and second annular sealing dams $D_1$ and $D_2$ of the first and second sealing surfaces 34 and 36 lies within the range of about 0.005 inch to about 0.040 inch.

The first and second sealing surfaces 34 and 36 are spaced apart by a first distance or height $d_1$ measured parallel to the center longitudinal axis C that is smaller than a second distance ($d_2$) measured perpendicular to the center longitudinal axis C between the first and second sealing surfaces 34 and 36. Thus, the annular center section 33 has a slope that is not greater than 45° with respect to the first and second contact planes $P_1$ and $P_2$ based on the geometry of right triangles (i.e., the Pythagorean theorem). However, in the illustrated embodiment, the first distance $d_1$ is substantially equal to a second distance $d_2$ as best seen in FIG. 4. Accordingly, the slope or incline of the annular center section 33 with respect to the first and second contact planes $P_1$ and $P_2$ is closer to forty-five derees than zero degrees, as seen in FIGS. 3–6.

The third annular section 33 is a frustoconical tube. The first and second annular end sections 31 and 32 are contiguously arranged at opposite axial ends of the annular center section 33 such that sealing loads applied substantially perpendicularly on the first and second annular sealing surfaces 34 and 36 primarily deform due to torsional stress of the metallic seal 10. In other words, the metallic seal 10 is deform less than 50% by collapsing or axial being such as in the S-shaped seals disclosed in U.S. Pat. Nos. 4,813,692 and 4,854,600. Preferably, the metallic seal 10 only collapses or bends axially by about 20%. The annular center section 33 preferably slopes about 45° relative to the first and second planes P and $P_2$ in the illustrated embodiment, as best seen in FIG. 6.

Figure 2:
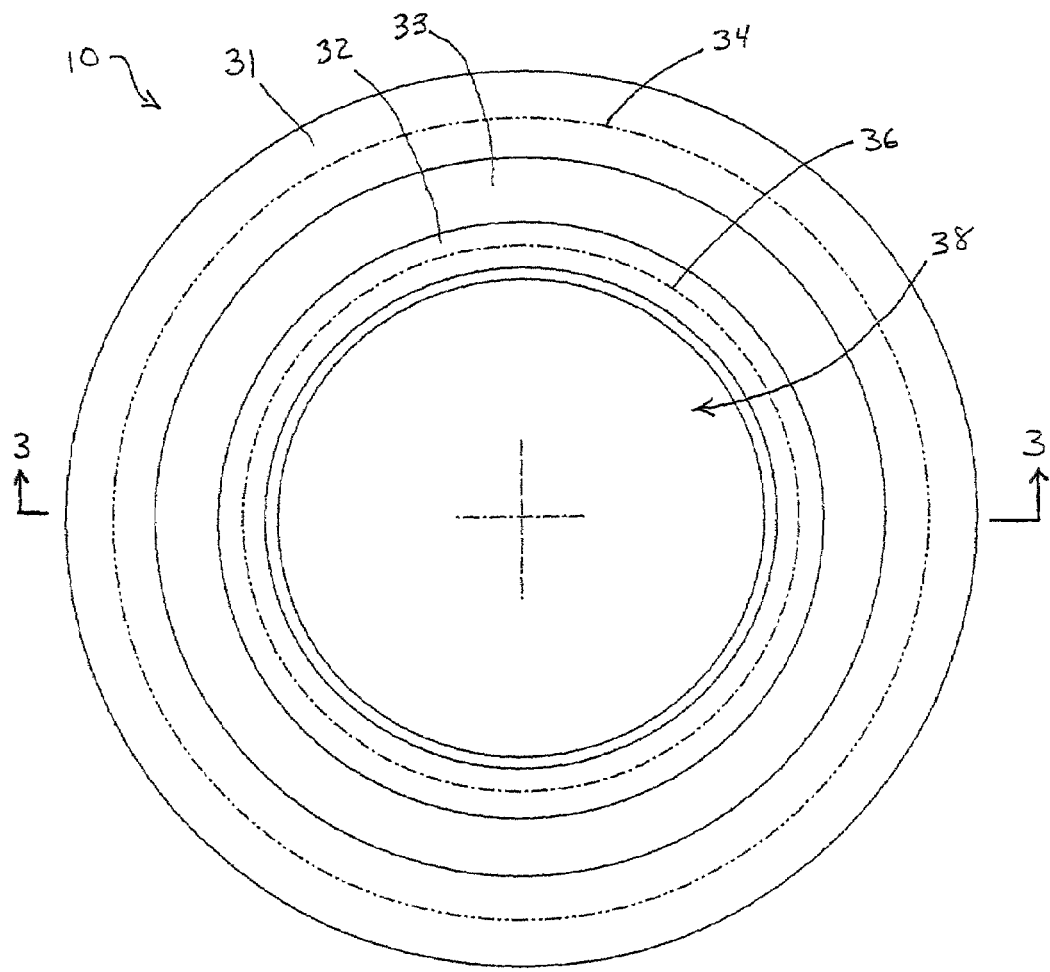
FIG. 2 is a top plan view of the shallow metallic seal illustrated in FIG. 1.
Figure 3:
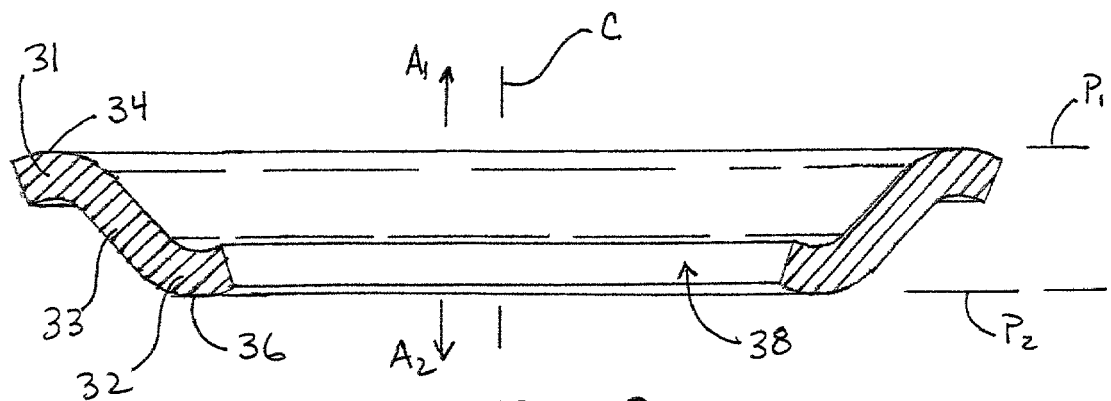
FIG. 3 is a cross-sectional view of the shallow metallic seal illustrated in FIGS. 1 and 2, as seen along section line 3—3 of FIG. 2.

The geometric and dimensional characteristics of seal 10 can be particularly seen in FIG. 4. Referring initially to FIG. 2, the outer diameter of seal 10 can be any desired shape depending upon the application of seal 10, i.e., there is no limit to its outer diameter. The inner diameter of seal 10 should be at least about 0.150 inch or greater. The free axial height $d_1$ of seal 10 is typically between about 0.030 inch to about 0.250 inch. In one example of the seal 10, the height $d_1$ is 0.035 inch, the outer diameter is 0.315 inch, and the inner diameter is 0.245 inch.

Figure 7:
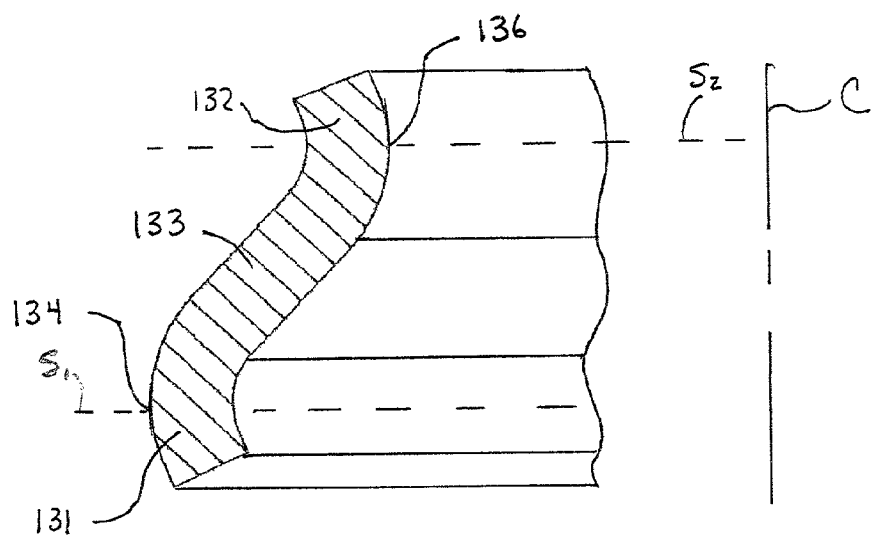
FIG. 7 is a longitudinal cross-sectional view of a shallow metallic seal according to a second embodiment of the present invention.

In this embodiment, the first and second directions $A_1$ and $A_2$ of the first and second sealing surfaces 34 and 36 face in directions that are substantially parallel to the center longitudinal axis C. Alternatively, as seen in FIG. 7, a seal 110 is illustrated having the first and second sealing surfaces 134 and 136 facing substantially perpendicular to the center longitudinal axis C. In other words, the first and second sealing surfaces 134 and 136 are concentric sealing surfaces that face either towards or away from the center longitudinal axis C. The metallic seal 110 is nearly identical to seal 10, discussed above, except that for the cross section as been rotated. In view of the similarities between seal 110 and seal 10, discussed above, seal 110 will not be discussed or illustrated in detail herein. Basically, the metallic seal 110 has a first annular end section 131, a second annular end section 132 and an annular center section 133.

Although only a portion of metallic seal 110 is illustrated herein, it will be apparent to those skilled in the art from this disclosure that seal 110 is a continuous ring which can be either circular or non-circular. Preferably, the cross-section of the seal 110 is uniform.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Possible variations of the illustrated the seal 10 include a range of diameters, shapes, heights, coatings, base materials chosen for coefficient of thermal expansion matches, pressure or vacuum sealing, sealing any fluid by choosing compatible materials, or any other variation typically used to configure the seal 10 for a given application. Another advantage of the cross section is the ability to seal on the inner and outer diameters and may be extended to other uses and industries. Furthermore, the foregoing description of the embodiments according to the present invention are provided for illustration only, and not for the purpose of limiting the invention as defined by the appended claims and their equivalents.

What is claimed is:

1. A metallic seal comprising:
    a first annular end section having a first annular sealing surface facing in a first direction and lying in a first contact plane to contact a first member for creating a first annular sealing dent therebetween, said first annular sealing surface being formed on a convexly curved surface;
    a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed on a convexly curved surface; and
    an annular center section extending between said first and second annular end sections to form a ring having a central passageway with a center longitudinal axis, said annular center section being frustoconically shaped with said first and second annular end sections being contiguously arranged at opposite ends of said annular center section such that sealing loads applied substantially perpendicularly an said first and second annular sealing surfaces primarily deform said metallic seal due to torsional stress of said metallic seal, said first and second annular end sections and said annular center section being arranged to form an S-shaped cross sectional profile,
    said first and second sealing surfaces being spaced apart by a first distance measured parallel to said center longitudinal axis that is substantially equal to a second distance measured perpendicular to said center longitudinal axis between said first and second sealing surfaces.

2. A metallic seal comprising:
    a first annular end section having a first annular sealing surface facing in a first direction and lying in a first contact plane to contact a first member for creating a first annular sealing dam therebetween, said first annular sealing surface being formed on a convexly curved surface;
    a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed on a convexly curved surface, each of said convexly curved surfaces extending through an arc of about 60°; and
    an annular center section extending between said first and second annular end sections to form a ring having a central passageway with a center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to font an S-shaped cross sectional profile.

3. The metallic seal according to claim 2, wherein said annular center section has a slope of about 45° with respect to said center longitudinal axis.

4. The metallic seal according to claim 3, wherein said first and second sealing surfaces are spaced apart by a first distance measured parallel to said center longitudinal axis that is substantially equal to a second distance measured perpendicular to said center longitudinal axis between said first and second sealing surfaces.

5. The metallic seal according to claim 2, wherein said convexly curved surfaces extend from a free end of said seal to said annular center section.

6. The metallic seal according to claim 5, wherein said annular center section has a slope of about 45° with respect to said center longitudinal axis.

7. The metallic seal according to claim 6, wherein said annular center section has a straight cross-sectional profile.

8. A metallic seal comprising:
    a first annular end section having a first annular sealing surface facing in a first axial direction and lying in a first contact plane to contact a first member for creating a first annular sealing dam therebetween, said first annular sealing surface being formed on a first convexly curved surface at a location that is spaced from a first free end of said first annular end section;
    a second annular end section having a second annular sealing surface facing in a second axial direction that is opposite to said first axial direction, and lying in a second contact plane that is substantially parallel to said first contact plane to contact a second member for creating a second annular sealing dam therebetween, said second annular sealing surface being formed on a second convexly curved surface at a location that is spaced from a second free end of said second annular end section; and
    an annular center section extending between said first and second annular end sections to form a ring having a central passageway with a center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said first and second annular sealing surfaces being located closer to midpoints of said first and second convexly curved surfaces than to said opposite ends of said annular center section and said first and second free ends, respectively, said first and second sealing surfaces being spaced apart by a first distance measured parallel to said center longitudinal axis that is substantially equal to a second distance measured perpendicular to said center longitudinal axis between said first and second sealing surfaces, said first and second contact planes of said first and second sealing surfaces being arranged substantially perpendicular to said center longitudinal axis.

9. A metallic seal comprising:

a first annular end section having a first annular sealing surface facing in a first radial direction and lying in a first contact plane to contact a first member for creating a first annular sealing dam therebetween, said first annular sealing surface being formed on a first convexly curved surface at a location that is spaced from a first free end of said first annular end section;

a second annular end section having a second annular sealing surface facing in a second radial direction that is opposite to said first direction, and lying in a second contact plane that is substantially parallel to said first contact plane to contact a second member for creating a second annular sealing dam therebetween, said second annular sealing surface being formed on a second convexly curved surface at a location that is spaced from a second free end of said second annular end section, each of said first and second convexly curved surfaces extending through an arc of about 60°; and an annular center section extending between said first and second annular end sections to form a ring having a central passageway with a center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said first and second annular sealing surfaces being located closer to midpoints of said first and second convexly curved surfaces than to said opposite ends of said annular center section and said first and second free ends, respectively, said first and second contact planes of said first and second sealing surfaces being arranged substantially parallel to said center longitudinal axis.

10. A metallic seal comprising:

a first annular end section having a first annular sealing surface facing in a first direction and lying in a first contact plane to contact a first member for creating a first annular sealing dam therebetween, said first annular sealing surface being formed on a convexly curved surface;

a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed on a convexly curved surface; and an annular center section extending between said first and second annular end sections to form a ring having a central passageway with a center longitudinal axis, said annular center section having a slope of about 45° with respect to said center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile.

11. The metallic seal according to claim 10, wherein said first and second directions of said first and second sealing surfaces are arranged substantially parallel to said center longitudinal axis.

12. The metallic seal according to claim 10, wherein said first and second directions of said first and second sealing surfaces are arranged to face substantially radially relative to said center longitudinal axis.

13. The metallic seal according to claim 10, wherein said seal is formed of a corrosion resistant alloy.

14. The metallic seal according to claim 10, wherein said seal is formed of a material selected from the group of nickel based alloys, copper based alloys, tin, aluminum based alloys and stainless steel.

15. The metallic seal according to claim 10, wherein said first and second annular end sections have substantially identical cross sectional profiles that are inverted.

16. A metallic seal comprising:

a first annular end section having a first annular sealing surface facing in a first direction and lying in a first contact plane to contact a first member for creating a first annular sealing dam therebetween, said first annular sealing surface being formed on a first convexly curved surface at a location that is spaced from a first free end of said first annular end section;

a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed on a second convexly curved surface at a location that is spaced from a second free end of said second annular end section, each of said first and second convexly curved surfaces extending through an arc of about 60°; and an annular center section extending between said first and second annular end sections to form a ring having a central passageway with a center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said first and second annular sealing surfaces being located closer to midpoints of said first and second convexly curved surfaces than to said first and second free ends, respectively.

17. A metallic seal comprising:

a first annular end section having a first annular sealing surface facing in a first direction and lying in a first contact plane to contact a first member for creating a first annular sealing dam therebetween, said first annular sealing surface being formed on a first convexly curved surface at a location that is spaced from a first free end of said first annular end section;

a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed on a second convexly curved surface at a location that is spaced from a second free end of said second annular end section; and an annular center section extending between said first and second annular end sections to form a ring having a central passageway with a center longitudinal axis, said annular center section having a slope of about 45° with respect to said center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said first and second annular sealing surfaces being located closer to midpoints of said first and second convexly curved surfaces than to said first and second free ends, respectively.

18. A metallic seal comprising:

a first annular end section having a first annular sealing surface facing in a first direction and lying in a first contact plane to contact a first member for creating a first annular sealing dam therebetween, said first annular sealing surface being formed on a first convexly curved surface at a location that is spaced from a first fret end of said first annular end section;

a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed on a second convexly curved surface at a location chat is spaced from a second free end of said second annular end section; and an annular center section extending between said first and second annular end sections to form a ring having a central passageway with a center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said first and second annular sealing surfaces being located closer to midpoints of said first and second convexly curved surfaces than to said first and second free ends, respectively, said first and second sealing surfaces being spaced apart by a first distance measured parallel to said center longitudinal axis that is substantially equal to a second distance measured perpendicular to said center longitudinal axis between said first and second sealing surfaces.

19. An axial metallic face seal comprising:

a first annular end section having a first annular sealing surface facing in a first direction and lying in a first contact plane to contact a first member for creating a first annular sealing dam therebetween, said first annular sealing surface being formed on a convexly curved surface extending through an arc to form a first free end that is spaced from said first annular scaling surface;

a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed on a convexly curved surface extending through an arc to form a second free end that is spaced from said second annular sealing surface; and an annular center section extending between said first and second annular end sections to form a ring having a central passageway with a center longitudinal axis that is substantially perpendicular to said first and second annular scaling surfaces, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said annular center section having a slope that is not greater than 45° with respect to said first and second contact planes.

20. The axial metallic face seal according to claim 19, wherein said first and second annular end sections have substantially identical cross sectional profiles that are inverted.

21. The axial metallic face seal according to claim 19, wherein said annular center section has a straight cross-sectional profile.

22. An axial metallic face seal comprising:

a first annular end section having a first annular sealing surface facing in a first direction and lying in a first contact plane to contact a first member for creating a first annular sealing dam therebetween, said first annular sealing surface being formed on a convexly curved surface extending through an arc to form a first free end that is spaced from said first annular scaling surface;

a second annular end section having a second annular sealing surface facing in a second direction that is opposite to said first direction, and lying in a second contact plane that is substantially parallel to said first contact plane to contact a second member for creating a second annular sealing dam therebetween, said second annular sealing surface being formed an a convexly curved surface extending through an arc to form a second free end that is spaced from said second annular sealing surface; and an annular center section extending between said first and second annular end sections to form a ring having a central passageway with a center longitudinal axis that is substantially perpendicular to said first and second annular sealing surfaces, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said first and second sealing surfaces being spaced apart by a first axial distance measured parallel to said center longitudinal axis that is smaller than a second radial distance measured perpendicular to said center longitudinal axis between said first and second sealing surfaces.

23. The axial metallic face seal according to claim 22, wherein
said first and second annular end sections have substantially identical cross sectional profiles that are inverted.

24. The axial metallic face seal according to claim 22, wherein
said annular center section has a straight cross-sectional profile.

25. A metallic seal comprising:
a first annular end section having a first annular sealing surface facing in a first direction to contact a first member for creating a first annular sealing dam therebetween, said first annular sealing surface being formed on a convexly curved surface extending through an arc to form a first free end that is spaced from said first annular sealing surface;

a second annular end section having a second annular sealing surface facing in a second direction that is opposite to said first direction to contact a second member for creating a second annular sealing dam therebetween that is substantially parallel to said first annular sealing dam, said second annular sealing surface being formed on a convexly curved surface extending through an arc to form a second free end that is spaced from said second annular sealing surface; and an annular center section extending between said first and second annular end sections to form a ring having a central passageway with a center longitudinal axis, said annular center section being frustoconically shaped with said first and second annular end sections being contiguously arranged at opposite ends of said annular center section such that sealing loads applied substantially perpendicularly on said first and second annular sealing surfaces primarily deform said metallic seal due to torsional stress of said metallic seal, said first and second annular end sections and said annular center section being arranged to form an S-shaped cross sectional profile with said first and second sealing surfaces being spaced apart by a first distance measured along said first and second directions that is smaller than a second distance measured perpendicular to said first and second directions, said annular center section being inclined at an angle relative to said first and second sealing dams, with said angle being closer to forty-five degrees than zero degrees.

26. The metallic seal according to claim 25, wherein
said first and second annular end sections have substantially identical cross sectional profiles that are inverted.

27. The metallic seal according to claim 25, wherein
said annular center section has a straight cross-sectional profile.

28. The metallic seal according to claim 25, wherein
said first and second directions are substantially parallel to said center longitudinal axis such that said metallic seal is an axial face seal.

* * * * *

UNITED STATES PATENT AND TRADEMARK OFFICE
CERTIFICATE OF CORRECTION

| | | |
|---|---|---|
| PATENT NO. | : 7,004,478 B2 | Page 1 of 1 |
| APPLICATION NO. | : 10/005178 | |
| DATED | : February 28, 2006 | |
| INVENTOR(S) | : John Loyd Spence and Stephen B. Rowland | |

It is certified that error appears in the above-identified patent and that said Letters Patent is hereby corrected as shown below:

Column 7, Line 29, (Claim 1), "dent" should be -- dam --
Column 7, Line 47, (Claim 1), "an" should be -- on --
Column 8, Line 19, (Claim 2), "font" should be -- form --
Column 9, Line 8, (Claim 8), "first: distance" should be -- "first distance" --
Column 9, Line 30, (Claim 9), "farmed" should be -- "formed" --
Column 10, Line 1, (Claim 10), "scaling" should be -- "sealing" --
Column 11, Line 47, (Claim 18), "fret" should be -- "free" --
Column 11, Line 55, (Claim 18), "chat" should be -- "that" --
Column 12, Line 20, (Claim 19), "scaling" should be -- "sealing" --
Column 12, Line 35, (Claim 19), "scaling" should be -- "sealing" --
Column 12, Line 63, (Claim 22), "scaling" should be -- "sealing" --
Column 13, Line 3, (Claim 22), "an" should be -- "on" --
Column 14, Line 39, (Claim 28), "scal" should be -- "seal" --

Signed and Sealed this
Thirtieth Day of October, 2012

David J. Kappos
*Director of the United States Patent and Trademark Office*